US005988944A

United States Patent [19]

Youngs

[11] Patent Number: 5,988,944

[45] **Date of Patent: *Nov. 23, 1999**

[54] ONE-PIECE TANK SUMP WITH INTEGRAL DUST COVER

[75] Inventor: Andrew Youngs, Granger, Ind.

[73] Assignee: Advanced Polymer Technology, Inc., Muskegon, Mich.

[ * ] Notice: This patent is subject to a terminal disclaimer.

[21] Appl. No.: 09/188,438

[22] Filed: Nov. 9, 1998

Related U.S. Application Data

[63] Continuation of application No. 08/661,694, Jun. 11, 1996, Pat. No. 5,833,392.

[51] Int. Cl.[6] .................................. B65G 5/00; B09B 3/00

[52] U.S. Cl. .............................. 405/52; 141/86; 215/386; 405/52

[58] Field of Search .............................. 405/52, 128, 154, 405/53; 52/19, 20; 141/86, 59; 220/315, 327, 378; 404/25, 26; 215/274, 286; D9/435, 443, 449

[56] References Cited

U.S. PATENT DOCUMENTS

| | | |
|---|---|---|
| D. 283,425 | 4/1986 | Bingler . |
| D. 284,380 | 6/1986 | Berg et al. . |
| D. 309,308 | 7/1990 | Webb . |
| D. 313,418 | 1/1991 | Webb . |
| D. 317,613 | 6/1991 | Channell . |
| D. 322,970 | 1/1992 | Webb . |
| D. 351,602 | 10/1994 | Rosebraugh et al. . |
| 360,165 | 3/1887 | LeCompte . |
| D. 383,763 | 9/1997 | Youngs . |
| 1,582,191 | 4/1926 | Snooke . |
| 1,639,495 | 8/1927 | Frame . |
| 1,793,038 | 2/1931 | Zimmerman . |
| 2,254,668 | 9/1941 | Tomek . |
| 2,310,877 | 2/1943 | Sperry . |
| 2,336,150 | 12/1943 | Horvath . |
| 2,449,229 | 9/1948 | Hopwood . |
| 2,671,573 | 3/1954 | Hendon et al. . |
| 2,911,001 | 11/1959 | Fuller . |
| 2,929,128 | 3/1960 | White . |
| 3,010,598 | 11/1961 | Foss . |
| 3,362,425 | 1/1968 | Morris et al. . |
| 3,390,224 | 6/1968 | Wyatt . |
| 3,401,958 | 9/1968 | Demyon . |
| 3,439,837 | 4/1969 | Hearn et al. . |
| 3,459,229 | 8/1969 | Croft . |
| 3,531,264 | 9/1970 | Greipel . |
| 3,543,377 | 12/1970 | Bremner . |
| 3,615,034 | 10/1971 | Lemelson . |
| 3,712,009 | 1/1973 | Campagna . |
| 3,715,958 | 2/1973 | Crawford et al. . |

(List continued on next page.)

FOREIGN PATENT DOCUMENTS

| | | |
|---|---|---|
| 245418 | 10/1969 | Russian Federation . |
| 1352272 | 11/1987 | Russian Federation . |

*Primary Examiner*—Dennis L. Taylor
*Attorney, Agent, or Firm*—Young & Basile, P.C.

[57] ABSTRACT

A tank sump has a one-piece body comprising a hollow base member for collecting fluids leaking from a piping system, the base member having an upper portion and a lower portion, and a hollow riser section having an upper portion and a lower portion, the riser lower portion extending upwardly from the base member upper portion, the riser section having sidewalls with alternately adjacent vertically extending wall portions and outwardly extending, U-shaped grip portions. An integrally formed cover is defined on top of the riser section upper portion. The cover may be cut off from the riser section of the body. A gasket may extend between the cover outer periphery and the outwardly extending grip portion of the riser section, and a mechanism removably secures the cover to the outwardly extending grip portion with the gasket therebetween, in a substantially water resistant sealing manner. The cover may alternately be cut away from the body and discarded. A substantially rigid lid is removably mounted on an outwardly extending grip portion of the riser section, and a mechanism mounts the lid to the outwardly extending grip portion in a substantially watertight manner.

12 Claims, 3 Drawing Sheets

U.S. PATENT DOCUMENTS

| | | |
|---|---|---|
| 3,721,270 | 3/1973 | Wittgenstein . |
| 3,802,456 | 4/1974 | Wittgenstein . |
| 3,858,752 | 1/1975 | Marvin, Jr. et al. . |
| 3,905,405 | 9/1975 | Fowler et al. . |
| 3,938,285 | 2/1976 | Gilbu . |
| 3,972,440 | 8/1976 | Warren . |
| 3,983,667 | 10/1976 | Zwick . |
| 4,062,376 | 12/1977 | McGrath . |
| 4,089,139 | 5/1978 | Moffa et al. . |
| 4,132,083 | 1/1979 | McGrath . |
| 4,145,075 | 3/1979 | Holzmann . |
| 4,230,234 | 10/1980 | Taylor . |
| 4,275,757 | 6/1981 | Singer . |
| 4,291,905 | 9/1981 | Schrock . |
| 4,309,128 | 1/1982 | Williams . |
| 4,449,715 | 5/1984 | Gagas . |
| 4,472,911 | 9/1984 | Jooris et al. . |
| 4,530,443 | 7/1985 | Gorges . |
| 4,540,310 | 9/1985 | Ditcher et al. . |
| 4,568,925 | 2/1986 | Butts . |
| 4,619,555 | 10/1986 | Skinner et al. . |
| 4,621,941 | 11/1986 | Ditcher et al. . |
| 4,639,164 | 1/1987 | Pugnale et al. . |
| 4,667,505 | 5/1987 | Sharp . |
| 4,685,327 | 8/1987 | Sharp . |
| 4,696,330 | 9/1987 | Raudman et al. . |
| 4,711,365 | 12/1987 | Fomby . |
| 4,714,095 | 12/1987 | Muller et al. . |
| 4,717,031 | 1/1988 | Hewson . |
| 4,717,036 | 1/1988 | Dundas et al. . |
| 4,747,453 | 5/1988 | Howard, Sr. . |
| 4,763,806 | 8/1988 | Podgers et al. . |
| 4,770,317 | 9/1988 | Podgers et al. . |
| 4,805,444 | 2/1989 | Webb . |
| 4,809,866 | 3/1989 | Crocker . |
| 4,871,084 | 10/1989 | Robbins . |
| 4,896,705 | 1/1990 | Podgers et al. . |
| 4,961,670 | 10/1990 | McKenzie et al. . |
| 4,971,225 | 11/1990 | Bavo . |
| 5,002,428 | 3/1991 | Shettel . |
| 5,040,408 | 8/1991 | Webb . |
| 5,058,633 | 10/1991 | Sharp . |
| 5,060,509 | 10/1991 | Webb . |
| 5,076,456 | 12/1991 | Geyer . |
| 5,085,257 | 2/1992 | Smith . |
| 5,099,894 | 3/1992 | Mozeley, Jr. . |
| 5,105,966 | 4/1992 | Fort et al. . |
| 5,114,271 | 5/1992 | Sunderhaus et al. . |
| 5,117,877 | 6/1992 | Sharp . |
| 5,129,428 | 7/1992 | Winter et al. . |
| 5,134,878 | 8/1992 | Sharp . |
| 5,156,292 | 10/1992 | Ross . |
| 5,257,652 | 11/1993 | Lawrence . |
| 5,271,518 | 12/1993 | Webb . |
| 5,333,490 | 8/1994 | Webb . |
| 5,372,453 | 12/1994 | Argandona . |
| 5,423,447 | 6/1995 | Youngs . |
| 5,481,790 | 1/1996 | Koreis et al. . |
| 5,482,400 | 1/1996 | Bavington . |
| 5,490,419 | 2/1996 | Webb . |
| 5,833,392 | 11/1998 | Youngs . |

ONE-PIECE TANK SUMP WITH INTEGRAL DUST COVER

CROSS REFERENCE TO PRIOR APPLICATION

This invention is a continuation of U.S. patent application Ser. No. 08/661,694 which was filed on Jun. 11, 1996, now U.S. Pat. No. 5,833,392.

BACKGROUND OF THE INVENTION

The present invention relates generally to fluid containment systems and, more particularly, to a sump for containing spillage, or the like, in systems storing hazardous fluids and/or chemicals, such as gasoline.

Sumps, in general, are employed in fluid storage systems to contain spillage, or the like, to prevent waste. In the case of hazardous materials, sumps are also used to prevent the escape of these hazardous materials and the possible safety and pollution problems that such escape could create. In gasoline storage systems, in particular, sumps may be used at junction points where spillage of hazardous materials typically occurs. In these sumps, there may or may not exist retrieval systems for the spilled materials. The sumps, however, are usually accessible for draining the material either automatically or manually.

In designing these containment systems, as well as in modernizing old systems, various types of sumps are needed for junction points in the storage plumbing system between the pumps and the storage tanks as well as at the storage filling points. Different systems with different types of hardware require varying sizes of sumps to conform to the needs of a particular system, making standardization of sumps difficult. Developing a standardized or adjustable sump would greatly reduce the costs in designing and modernizing these systems.

Adjustable sumps have been developed and are used in the field of gasoline storage systems, but are inconvenient to use. Sumps presently exist where the housing of the sump is adjustable using sliding and bellows-type connections for adjusting the vertical height of the sump. Also, sumps with score lines on the housings exist for cutting and taping together the sump housing for installment in the system. These systems result in sumps that leak and must be repaired or replaced frequently to avoid escaping hazardous wastes.

In addition to being inconvenient to use and maintain, sumps generally in use at present are rather expensive to manufacture, install and maintain. Further, one sump is generally dedicated to the needs of one particular site, for example, one site may require a substantially watertight sump, while another site may not. In such a case, two separate, specialized sumps must be purchased and installed. This adds to the cost of manufacture due to the added cost of separate tooling and the like, as well as the need for increased inventory reserve. As a consequence, these increased costs translate into increased costs for the consumer.

Thus, it is an object of the present invention to provide a sump which is simple and cost effective to manufacture. It is a further object of the present invention to provide such a sump which may be quickly and cost effectively converted to a water resistant sump or to a watertight sump. Still further, it is an object of the present invention to provide such a sump which is height adjustable. It is yet a further object of the present invention to provide such a sump which allows ease in transportation, handling and assembly.

SUMMARY OF THE INVENTION

The present invention addresses and solves the problems enumerated above. The present invention comprises a tank sump having a one-piece body. The one-piece body comprises a hollow base member for collecting fluids leaking from a piping system, the base member having an upper portion and a lower portion, and a hollow riser section having an upper portion and a lower portion, the riser lower portion extending upwardly from the base member upper portion, the riser section having sidewalls with alternately adjacent vertically extending wall portions and outwardly extending, U-shaped grip portions. The tank sump further comprises an integrally formed cover defined on top of the riser section upper portion. The cover may be cut off from the riser section of the body, and the tank sump may further comprise a gasket extending between the cover outer periphery and the outwardly extending grip portion of the riser section, and means for removably securing the cover to the outwardly extending grip portion with the gasket therebetween, in a substantially water resistant sealing manner.

The cover may alternately be cut away from the body and discarded, and the sump may further comprise a substantially rigid lid removably mounted on an outwardly extending grip portion of the riser section, wherein the lid permits access to the interior of the sump when removed, and prevents dust and particulate contaminants from entering the interior of the sump when mounted, and means for mounting the lid to the outwardly extending grip portion in a substantially watertight manner.

BRIEF DESCRIPTION OF THE DRAWINGS

Other objects, features and advantages of the present invention will become apparent by reference to the following detailed description and drawings, in which.

DETAILED DESCRIPTION OF THE PREFERRED EMBODIMENTS

Figure 1:
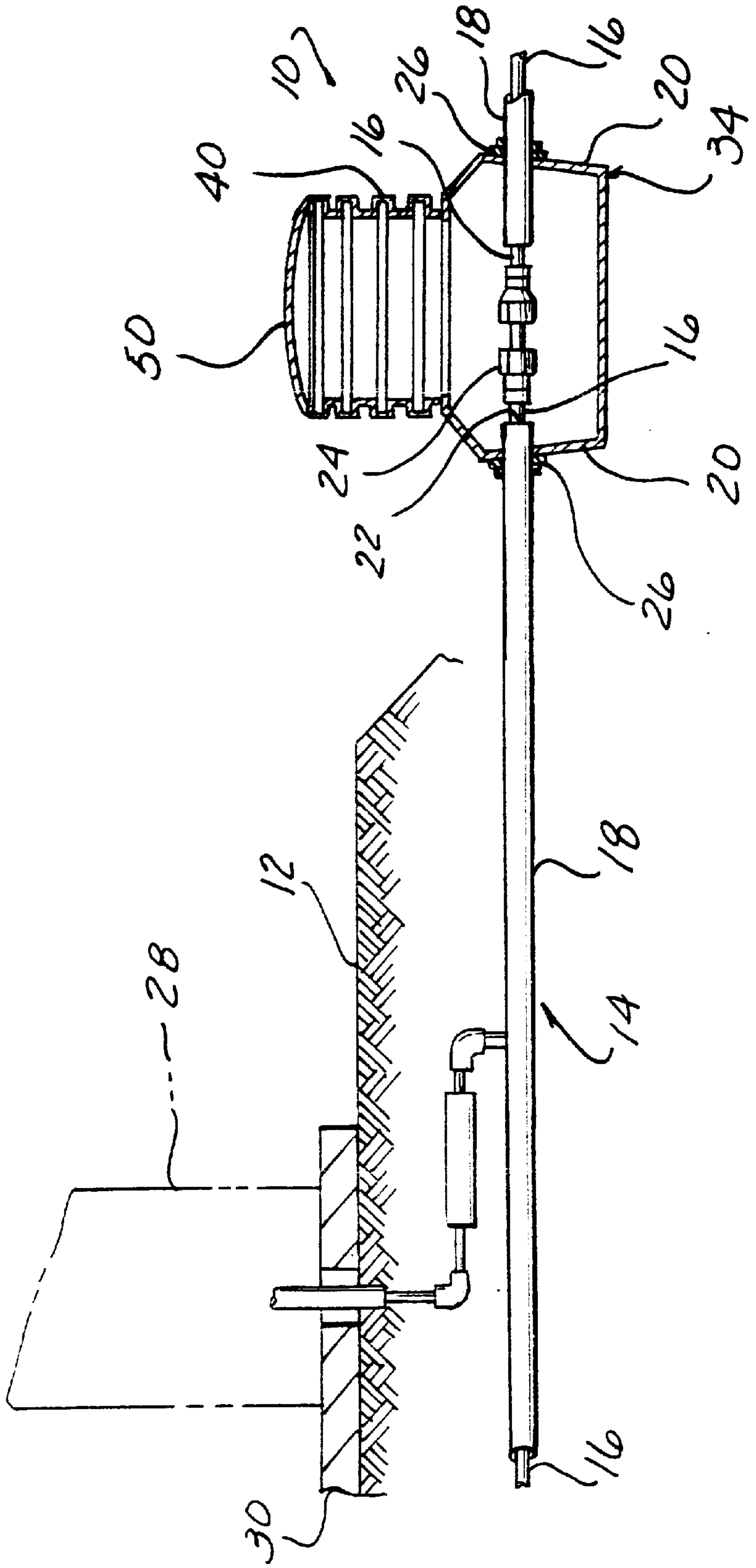
FIG. 1 is an overall, schematic, cutaway plan view of a tank sump of the present invention shown in cross section in an exemplary installation, showing a secondary containment piping system extending therethrough, and showing a dispenser in phantom.

Referring now to FIG. 1, the tank sump of the present invention is designated generally as 10. The sump 10 is shown substantially below the ground level 12, with an exemplary flexible secondary containment piping system 14 shown running therethrough. The secondary containment piping system 14 has a flexible primary supply pipe 16 carried within a flexible, outer secondary containment pipe 18. The outer containment pipe 18 extends into the sump 10 a sufficient distance so that it clears the interior of the wall

20 of the sump 10. During fabrication, this will permit the insertion on the terminated end 22 of pipe 18 of a suitable air pressure device to permit testing. The inner pipe 16 extends past the terminated end 22 of the outer pipe 18 a sufficient distance to permit it to be coupled by suitable conventional couplings 24 to another inner pipe 16 which, in turn extends outwardly from the sump 10 through an outer containment pipe 18. As shown, the piping system 14 may eventually run to a dispenser 28 mounted on concrete 30.

The outer containment pipe 18 with inner supply pipe 16 therein are connected to the sump 10 in a fluid tight manner by a suitable flexible entry boot 26. When the entry boot 26 is to be installed, a suitable bore is made in the sump 10 at an appropriate location, as required by the particular site. One example of a suitable flexible entry boot is disclosed in my U.S. Pat. No. 5,431,457, which is incorporated herein by reference.

Figure 2:
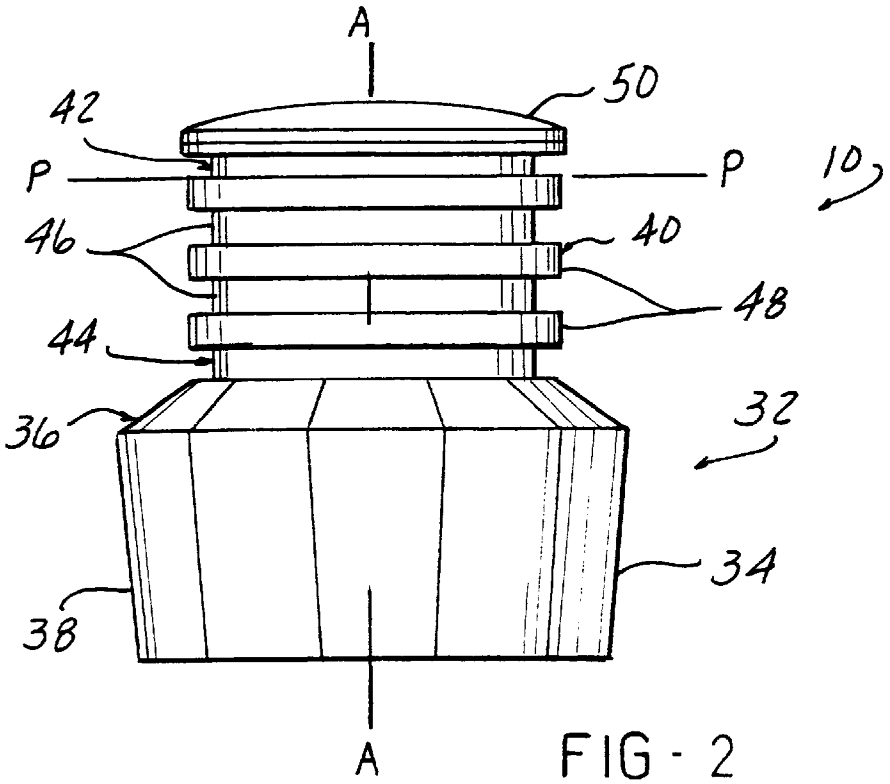
FIG. 2 is a front view of the one-piece tank sump of the present invention with the dust cover shown still integrally attached thereon.

As can best be seen in FIG. 2, the tank sump 10 comprises a one-piece body 32 having a hollow base member 34 for collecting fluids leaking from a piping system 14. The base member 34 has an upper portion 36 and a lower portion 38. The one-piece body 32 further comprises a hollow riser section 40 having an upper portion 42 and a lower portion 44, the riser lower portion 44 extending upwardly from the base member upper portion 36. The riser section 40 has sidewalls with alternately adjacent vertically extending wall portions 46 and outwardly extending, U-shaped grip portions 48.

The tank sump 10 further comprises an integrally formed cover 50 defined on top of the riser section upper portion 42. It is to be understood that tank sump 10 may be formed from any suitable material, such as polyethylene, nylon, polypropylene or fiberglass reinforced plastic, however, in the preferred embodiment, it is made of a polymeric material resistant to water and hydrocarbons, for example, cross-linked polyethylene. The one-piece body 32 and integral cover 50 may be molded by any suitable process, such as blow molding or injection molding, however, in the preferred embodiment, the sump 10 is rotationally molded.

Figure 3:
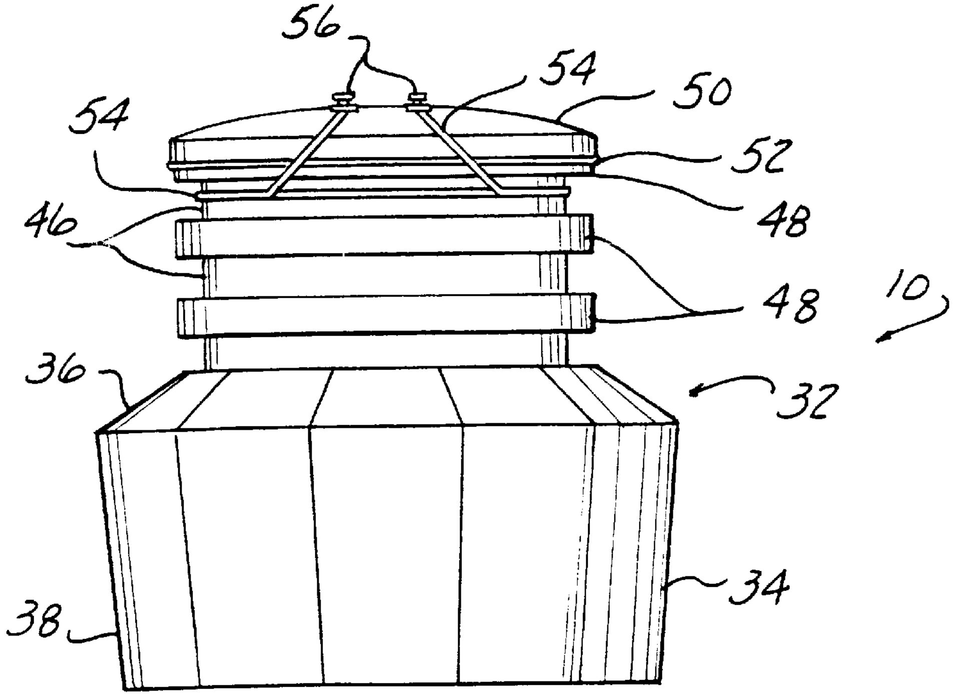
FIG. 3 is a front view of an alternate embodiment of the tank sump of the present invention, showing a water resistant sealing means.

As can be seen in FIGS. 2 and 3, the riser section upper portion has a first diameter at a vertically extending wall portion 46 and a second diameter at an outwardly extending grip portion 48, and the cover 50 has a third diameter, the third diameter being larger than the second diameter. The cover 50 diameter should be large enough (when cut off from the riser section 40, as described further hereinbelow) to fit over the outwardly extending grip portion 48 of the riser section upper portion 42, without being so large as to be easily knocked off or dislodged. As can be seen in FIG. 3, the cover 50 is just slightly larger than the outwardly extending grip portion 48, causing somewhat of an interference fit.

The body 32 may also be height adjustable by cutting away a vertically extending wall portion 46 through a plane P normal to axis A and extending parallel to, and substantially even with an uppermost portion of a downwardly adjacent outwardly extending grip portion 48 (as seen in FIG. 2, with the consequent height adjustment shown in FIG. 3). It is to be understood that plane P may be located at any uppermost portion of a downwardly adjacent outwardly extending grip portion 48, to change the height as necessitated by a particular site and end use. Further, although three outwardly extending grip portions 48 and four vertically extending wall portions 46 have been shown, it is to be understood that the sump 10 may be manufactured with any number of grip portions 48 and wall portions 46, for any desired initial riser section 40 height.

The cover 50 may be cut away from the body 32 and installed over an outwardly extending grip portion 48 of the riser section 40. In this manner, the cover 50 permits access to the interior of the sump 10 when cover 50 is removed, and prevents dust and particulate contaminants from entering the interior of the sump 50 when installed over an outwardly extending grip portion 48.

As opposed to the dust cover 50 described immediately above, if a more water resistant sump 10 is desired for a particular site, the tank sump 10 may further comprise an O-ring or gasket 52 extending between the cover 50 outer periphery and the outwardly extending grip portion 48 of the riser section 40, as best seen in FIG. 3. It is to be understood that the gasket 52 may be formed from any material suitable for sealing, however, in the preferred embodiment, the gasket is formed from a flexible, water and hydrocarbon resistant material, such as nitrile rubber.

The sump 10 may further comprise means for removably securing the cover 50 to the outwardly extending grip portion 48 with the gasket 52 therebetween, in a substantially water resistant sealing manner. It is to be understood that this securing means may comprise any suitable means. However, in the preferred embodiment, this securing means comprises an elastic cord 54 extending about a vertically extending wall portion 46 and the cover 50. As can be seen in FIG. 3, cord 54 may be looped around plugs 56 partially extending outward from apertures (for molding purposes) defined in cover 50. However, it is to be understood that cord 54 may be secured in any suitable manner.

Figure 4:
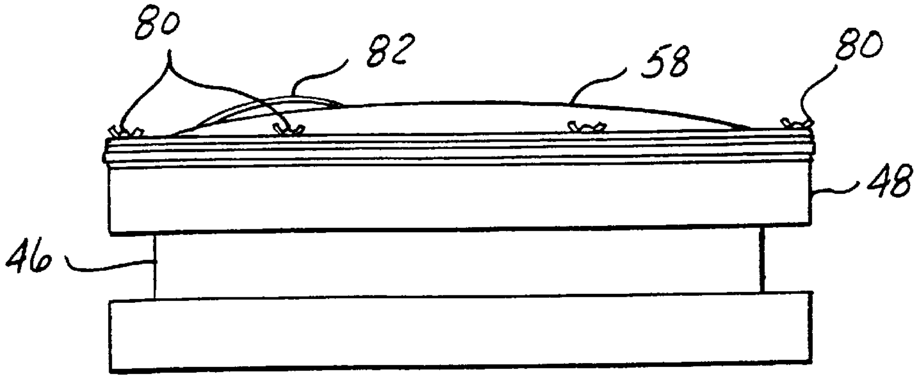
FIG. 4 is an enlarged cutaway front view of a further alternate embodiment of the tank sump of the present invention, showing an alternate lid with watertight sealing means.
Figure 5:
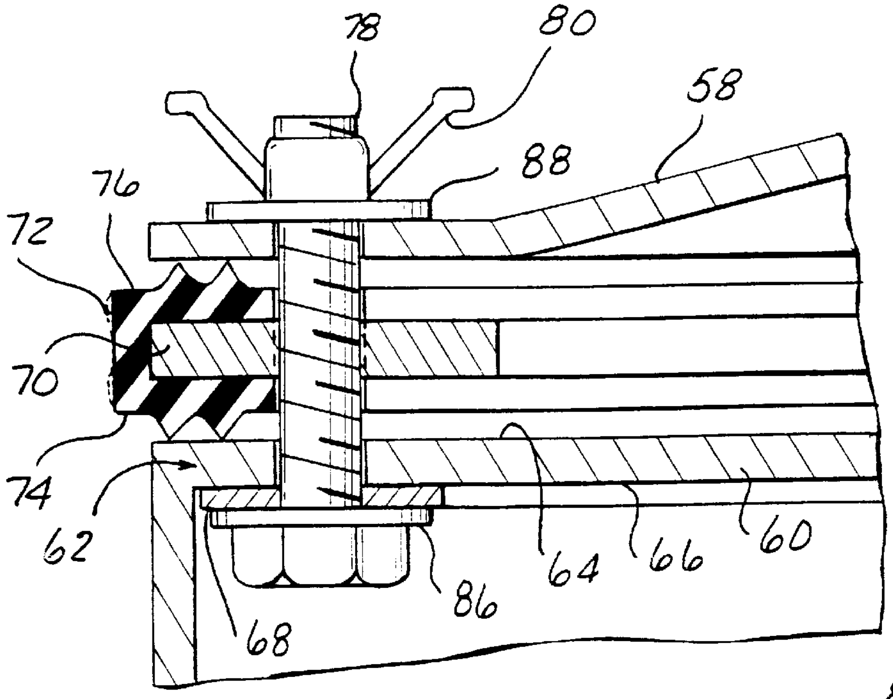
FIG. 5 is a further enlarged, cutaway cross-sectional view showing one bolt and wing nut assembly in conjunction with the watertight sealing means, shown before the assembly tightens the sealing means.

As opposed to the more water resistant sump 10 as described immediately above, if a more watertight sump 10 is desired for a particular site, the cover 50 may be cut away from the body 32 and discarded or recycled. Referring now to FIG. 4, the tank sump 10 may then further comprise a substantially rigid lid 58 removably mounted on an outwardly extending grip portion 48 of the riser section 40, wherein the lid 58 permits access to the interior of the sump 10 when lid 58 is removed, and prevents dust and particulate contaminants from entering the interior of the sump 10 when mounted. It is to be understood that lid 58 may be formed from any suitable material, however, in the preferred embodiment, the lid 58 is formed from powder coated steel. This is generally a baked on coating of epoxy, polyester or polyethylene which is applied as a powder and then baked on. For ease in installation and removal, lid 58 may further include a handle 82. As best seen in FIG. 5, the outwardly extending, U-shaped grip portion 48 has an upper, inwardly extending leg 60 having an outer periphery 62 with an upper surface 64 and a lower surface 66.

The sump 10 may further comprise means for mounting the lid 58 to the outwardly extending grip portion 48 in a substantially watertight manner. It is to be understood that this mounting means may comprise any suitable means. However, in the preferred embodiment, this mounting means comprises a first substantially rigid ring 68 disposed about the inwardly extending leg outer periphery lower surface 66 and a second substantially rigid ring 70 disposed about the inwardly extending leg outer periphery upper surface 64. It is to be understood that rings 68 and 70 may be formed from any suitably rigid material, which, in combination with lid 58, lends strength and stiffness to sump 10. However, in the preferred embodiment, each of the first 68 and second 70 substantially rigid rings are formed from steel.

The lid mounting means further comprises means for sealing extending between the outer periphery upper surface

64 and the second ring 70, and means for sealing extending between the second ring 70 and the lid 58. It is to be understood that both of these sealing means may comprise any suitable means, such as each comprising an O-ring or the like. However, in the preferred embodiment, both of these sealing functions are carried out by a single, U-shaped seal member 72 having a lower leg 74 extending between the outer periphery upper surface 64 and the second ring 70 and an upper leg 76 extending between the second ring 72 and the lid 58. It is to be understood that the seal member 70 may be formed from any suitably flexible material resistant to water and hydrocarbons. However, in the preferred embodiment, this seal member 72 is formed from nitrile rubber.

The lid mounting means further comprises means for fastening the inwardly extending leg 60, the first 68 and second 70 rings, the sealing means and the lid 58. It is to be understood that this fastening means may comprise any suitable means, however, in the preferred embodiment, the fastening means comprises a bolt 78 and nut assembly, the bolt 78 extendable through coaxial bores defined in each of the first 68 and second 70 rings, the U-shaped grip portion upper, inwardly extending leg 60, and the lid 58. If a bolt and nut assembly is used, any suitable bolt and nut may be used as desired. As shown in FIG. 5, a bolt 78 extends upwardly with a wing nut 80 threadingly engaged thereon. However, although not shown, bolt 78 could extend downwardly as well. For illustrative purposes, the bolt 78 and wing nut 80 assembly is shown not fully tightened in FIG. 5. In addition, the fastening means may further comprise a first washer 86 and a second washer 88.

Figure 6:
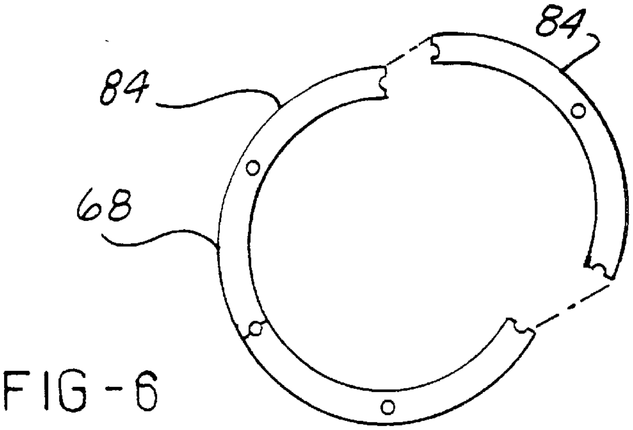
FIG. 6 is a top view of the first rigid ring, shown formed of three sections, with one section exploded away.

As shown in FIG. 6, for ease in installation, the first substantially rigid ring 68 may be formed from at least two sections 84 (three sections 84 are shown).

The tank sump 10 as described hereinabove achieves, but is not limited to, the objects and advantages described more fully above.

While preferred embodiments, forms and arrangements of parts of the invention have been described in detail, it will be apparent to those skilled in the art that the disclosed embodiments may be modified. Therefore, the foregoing description is to be considered exemplary rather than limiting, and the true scope of the invention is that defined in the following claims.

What is claimed is:

1. A tank sump, comprising:

a one-piece body, comprising:

a hollow base member for collecting fluids, the base member having an upper portion; and a hollow riser section having an upper portion and a lower portion, the riser upper portion having an opening, the riser lower portion extending upwardly from the base member upper portion, the riser section having sidewalls with alternately adjacent vertically extending wall portions and outwardly extending grip portions, wherein the riser upper portion further has an upper, horizontally extending leg having an outer periphery with an upper surface and a lower surface; and means for removably mounting a lid on top of the riser section upper portion to cover the opening in a substantially water resistant manner, the lid permitting access into the body when the lid is removed, and the lid preventing contaminants from entering into the body when the lid is mounted, wherein the lid mounting means comprises:

a first substantially rigid ring disposed about the leg outer periphery lower surface;

a second substantially rigid ring disposed about the leg outer periphery upper surface;

means for sealing the lid to the body; and means for fastening the leg, the first and second rings, the sealing means and the lid.

2. The tank sump according to claim 1, wherein the upper portion of the riser section has a first diameter at the vertically extending wall portions and has a second diameter at the outwardly extending grip portions, the second diameter being significantly greater than the first diameter such that the outwardly extending grip portions provide means for gripping the riser section of the tank sump.

3. The tank sump according to claim 2, wherein each of said outwardly extending grip portions has a substantially U-shaped cross-section.

4. The tank sump according to claim 2, wherein the body has means for being height adjustable, the height adjustable means including means for permitting the cutting away of at least one said vertically extending wall portion through a plane extending parallel to and substantially even with an uppermost portion of one downwardly-adjacent said outwardly extending grip portion.

5. The tank sump according to claim 1, wherein the lid sealing means is attached to the second ring.

6. The tank sump according to claim 5, wherein the second ring has an upper surface and a lower surface, and wherein the sealing means includes a seal member having an upper leg, and a lower leg, the lower leg being mountable between the body and the lower surface of the second ring, the upper leg being mountable between the lid and the upper surface of the second ring.

7. The tank sump according to claim 6, wherein the second ring has a radial surface, and wherein the seal member has a substantially U-shaped cross-section such that the seal member is attached to the upper surface, the radial surface, and the lower surface of the second ring.

8. The tank sump according to claim 7, wherein the fastening means comprises at least one bolt and at least one nut, the at least one bolt being extendable through coaxial bores defined in the lid, the second ring, the body, and the first ring.

9. The tank sump according to claim 1 wherein the lid sealing means comprises:

means for sealing extending between the outer periphery upper surface and the second ring; and means for sealing extending between the second ring and the lid.

10. The tank sump according to claim 9 wherein both sealing means comprise at least one U-shaped seal member having a lower leg extending between the outer periphery upper surface and the second ring and an upper leg extending between the second ring and the lid.

11. The tank sump as defined in claim 1 wherein the first substantially rigid ring is formed from at least two sections.

12. The tank sump as defined in claim 1 wherein the sump is formed from a polymeric material resistant to water and hydrocarbons, the lid is formed from powder coated steel, and each of the first and second substantially rigid rings are formed from steel.

* * * * *